(12) United States Patent
Huet

(10) Patent No.: US 7,967,539 B2
(45) Date of Patent: Jun. 28, 2011

(54) FASTENER PROVIDED WITH A SNAP-ENGAGEMENT FOOT FOR THRUSTING THROUGH A HOLE IN A PANEL

(75) Inventor: Laurent Huet, Meru (FR)

(73) Assignee: I.T.W. de France, Beauchamp (FR)

( * ) Notice: Subject to any disclaimer, the term of this patent is extended or adjusted under 35 U.S.C. 154(b) by 428 days.

(21) Appl. No.: 12/160,272

(22) PCT Filed: Dec. 27, 2006

(86) PCT No.: PCT/IB2006/003781
§ 371 (c)(1),
(2), (4) Date: Jul. 8, 2008

(87) PCT Pub. No.: WO2007/099393
PCT Pub. Date: Sep. 7, 2007

(65) Prior Publication Data
US 2009/0022567 A1 Jan. 22, 2009

(30) Foreign Application Priority Data
Mar. 2, 2006 (FR) ...................................... 06 50734

(51) Int. Cl.
*F16B 35/00* (2006.01)

(52) U.S. Cl. ........................... 411/508; 411/509; 411/510

(58) Field of Classification Search .................. 411/508, 411/509, 510, 363
See application file for complete search history.

(56) References Cited

U.S. PATENT DOCUMENTS

| 3,230,592 | A | * | 1/1966 | Hosea | 24/297 |
| 3,550,217 | A | * | 12/1970 | Collyer | 411/509 |
| 4,396,329 | A | * | 8/1983 | Wollar | 411/508 |
| 4,427,328 | A | * | 1/1984 | Kojima | 411/508 |
| 5,319,839 | A | * | 6/1994 | Shimajiri | 24/453 |
| 5,573,362 | A | | 11/1996 | Asami et al. | |
| 5,632,649 | A | | 5/1997 | Spangler | |
| 5,658,110 | A | * | 8/1997 | Kraus | 411/510 |
| 5,689,863 | A | * | 11/1997 | Sinozaki | 24/297 |

(Continued)

FOREIGN PATENT DOCUMENTS
CN 1135668 A 11/1996
(Continued)

OTHER PUBLICATIONS
ISR for PCT/IB2006/003781 dated Jun. 27, 2007.

*Primary Examiner* — Victor Batson
*Assistant Examiner* — Roberta Delisle
(74) *Attorney, Agent, or Firm* — Lowe Hauptman Ham & Berner LLP

(57) ABSTRACT

The fastener comprises a head and a snap-engagement foot comprising a rigid core and curved flexible wings. Each wing has a convex surface bordered by said core, by a longitudinal edge surface and by a transverse edge surface. Each transverse edge surface has, viewed by an observer viewing said convex surface, a V-shape of which the point, which is directed outwardly, is located at said inflection plane. The core is a hub about which at least three said wings are regularly spaced. Each wing comprises a corner delimited by said longitudinal edge surface and by a shoulder and a web less thick than the corner, disposed between the hub and the shoulder. Each wing is adapted to flex by elastic deformation towards the convex surface of the neighboring wing.

11 Claims, 7 Drawing Sheets

U.S. PATENT DOCUMENTS

| | | | |
|---|---|---|---|
| 5,759,002 A | 6/1998 | Essenberg | |
| 6,305,055 B1 | 10/2001 | Castro | |
| 7,237,995 B2 | 7/2007 | Perez et al. | |
| 7,328,489 B2 * | 2/2008 | Leverger et al. | 24/453 |
| 7,553,116 B2 | 6/2009 | Lesecq | |
| 2002/0028123 A1 * | 3/2002 | Miura et al. | 411/508 |
| 2002/0037206 A1 * | 3/2002 | Okada et al. | 411/508 |
| 2002/0106261 A1 * | 8/2002 | Nakanishi | 411/508 |

FOREIGN PATENT DOCUMENTS

| | | |
|---|---|---|
| CN | 1141667 A | 1/1997 |
| CN | 2303966 Y | 1/1999 |
| CN | 1680729 A | 10/2005 |
| CN | 2733057 Y | 10/2005 |
| CN | 1828071 A | 9/2006 |
| FR | 2789454 A1 | 8/2000 |

* cited by examiner

FASTENER PROVIDED WITH A SNAP-ENGAGEMENT FOOT FOR THRUSTING THROUGH A HOLE IN A PANEL

RELATED APPLICATIONS

The present application is based on International Application Number PCT/IB06/003781 filed Dec. 27, 2006, and claims priority from French Application Number 0650734 filed Mar. 2, 2006, the disclosures of which are hereby incorporated by reference herein in their entirety.

The invention generally concerns fasteners for fixing a member to a panel such as a car body sheet metal panel It is known that such fasteners exist which, for them to be fixed, are provided with a snap-engagement foot for thrusting through a hole of predetermined diameter in the panel.

Such a fastener is known in particular from the document FR 2 789 454 which is provided with a head and a snap-engagement foot comprising a flat rigid core and two curved flexible wings. This rigid core has two longitudinal edge surfaces converging towards a pointed end while, by its other end, it is connected to the rest of the fastener. Each wing is connected to that core along one of the two longitudinal edge surfaces of the core and has, facing a respective planar face of the core, an inner surface bordered by that planar face, by a longitudinal edge surface of that wing and by a transverse edge surface of that wing. The outer surface of the foot tapers respectively towards the free end and towards the transverse edge surface of the wings, on each side of an inflection plane that is transversely oriented to the axial direction of the foot. This outer surface of the foot has, at the inflection plane, a generally oval shape of which the small width is located along the median axial plane of the core and of which the large width is located along the axial plane transversely oriented to the median axial plane of the core. To enable snap engagement of the foot in the hole, each wing is adapted to flex by elastic deformation towards the planar face of the core which faces its inner surface. The inner surface of each wing is concave and the longitudinal edge surface of each wing has, viewed by an observer situated parallel to the planar face of the core which faces its inner surface, a V-shape of which the point, which is directed outwardly, is located at the inflection plane on each side of which the outer surface of the foot tapers.

Such a fastener is greatly appreciated since it makes it possible to minimize the force required to introduce the foot into the hole and to maximize the retaining force given by the snap-engagement foot to prevent extraction of the fastener.

The invention is directed to providing a fastener of the same type but with improved performance in terms of resistance to the extraction forces exerted on it, while being particularly simple and convenient to manufacture and to use.

To that end, the invention provides a fastener provided with a head and a snap-engagement foot for thrusting through a hole in a panel, said foot comprising a rigid core, which extends from said head, and curved flexible wings, each said wing having a convex surface bordered by said core, by a longitudinal edge surface and by a transverse edge surface facing said head, said foot tapering respectively towards the free end of said core and towards said transverse edge surfaces on each side of an inflection plane that is transversely oriented to said core, characterized in that each said longitudinal edge surface has, viewed by an observer viewing said convex surface, a V-shape of which the point, which is directed outwardly, is located at said inflection plane, said core being a hub about which at least three said wings are regularly spaced, each said wing comprising a corner delimited by said longitudinal edge surface on each side of said inflection plane and by a shoulder, said shoulder and the surface of the corner situated between said longitudinal edge surface and said shoulder being on the opposite side from said convex surface, each said wing also comprising a web less thick than said corner, disposed between said hub and said shoulder, each said wing being adapted, in order to allow the snap engagement of said foot in said hole, to flex by elastic deformation towards the convex surface of the neighboring wing situated on the same side as said shoulder.

On thrusting the snap-engagement foot into the hole in the panel, the effect of the cooperation between the outline of the hole and the wings is that by elastic deformation each wing, while it is in contact with the outline of the hole, flexes, in its introductory part that is situated between the pointed end and the inflection plane, towards the convex surface of the neighboring wing. The wings thus flex progressively with insertion until the point at which the introductory part of the wings has passed though the hole. Each of the wings then relaxes, the effect of the cooperation between the outline of the hole and the corners, in the retaining part situated between the inflection plane and the transverse edge surface, being to drive the foot in the direction of insertion until the rest of the fastener abuts the surface of the panel situated at the side from which the fastener is introduced, by means of a frusto-conical fluid-tight collar.

Once mounted, on relative movement between the member to fix and the panel or on dismantling, the fastener may be subject to extraction forces not strictly oriented in the axial direction. As each wing is in contact with the outline of the hole, when the fastener is subject to such a force, several neighboring wings may deform and contribute to resisting that force.

It will be noted that in the above-mentioned prior fastener, the outline of the hole is in contact with the edge surfaces of the rigid core and with the outer surface of each wing. That fastener gives very high resistance to forces oriented in the plane of the rigid core. On the other hand, forces which are not oriented in that plane meet less resistance since that resistance is only provided by a single wing.

According to features of implementation that are particularly simple and convenient both with respect to manufacture and use:

- said longitudinal edge surface comprises on each side of said inflection plane a branch having, on said corner, a convergent outline and a pointed end at said inflection plane; and possibly
- said branch situated in the introductory part that is situated between said free end and said inflection plane, comprises a first branch portion belonging to said web and a second branch portion belonging to said corner which has a junction zone with said convex surface, said junction zone being situated on a locus continuous with said first branch portion; and/or
- for each said wing, said transverse edge surface extends between said hub and said shoulder, facing said head; and/or
- said longitudinal edge surface comprises in the introductory part of each said wing, situated between said free end and said inflection plane, a branch that is longer than the branch situated in the retaining part of that wing, situated between said inflection plane and said transverse edge surface of that wing; and/or
- said shoulder is rectilinear; and/or
- said web is of constant thickness; or
- said web has a greater thickness towards said transverse edge surface than towards said free end; and/or said wings are each of the same form; and/or said fastener comprises six said wings.

The features and advantages of the invention will appear from the following description, given by way of preferred but non-limiting example, with reference to the accompanying drawings in which.

Figure 1:
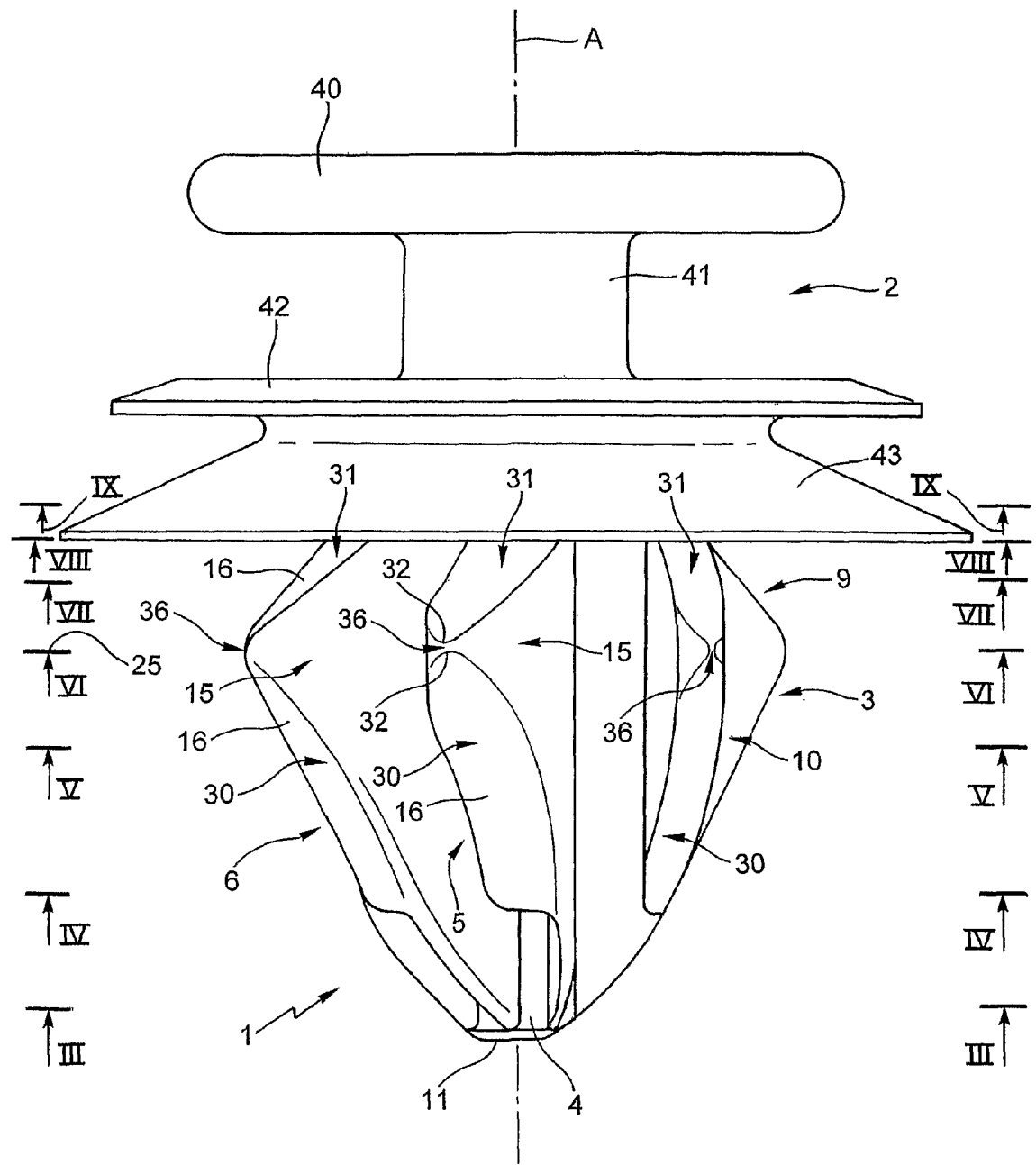
FIG. 1 is a view in elevation of a fastener according to the present invention.
Figure 4:
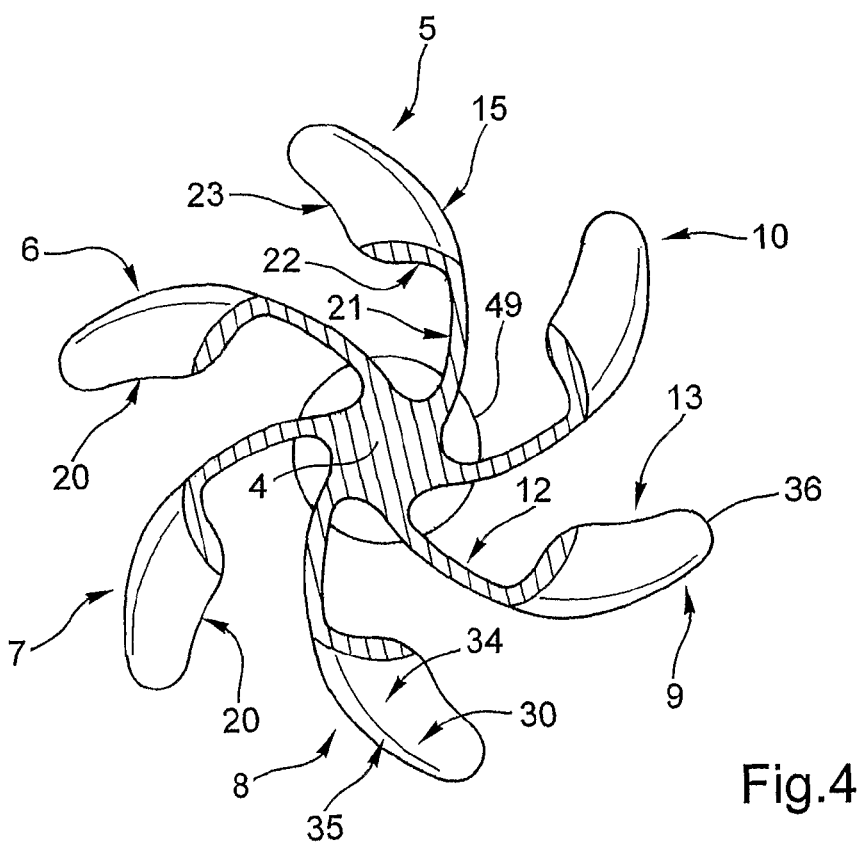
Figure 5:
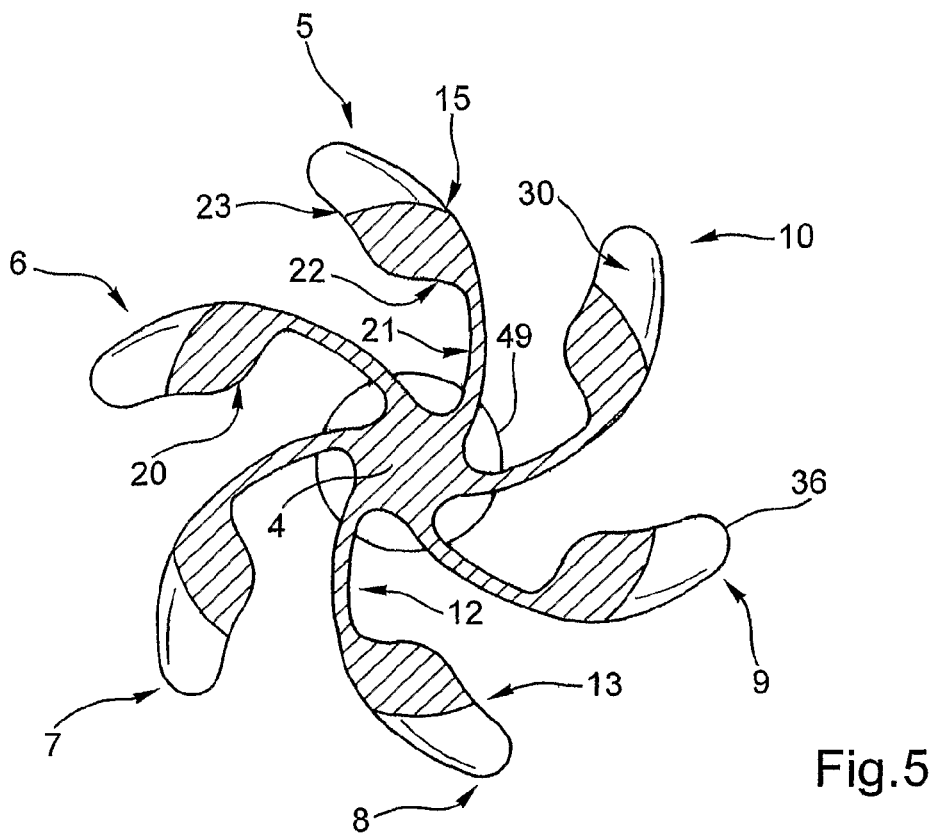
Figure 6:
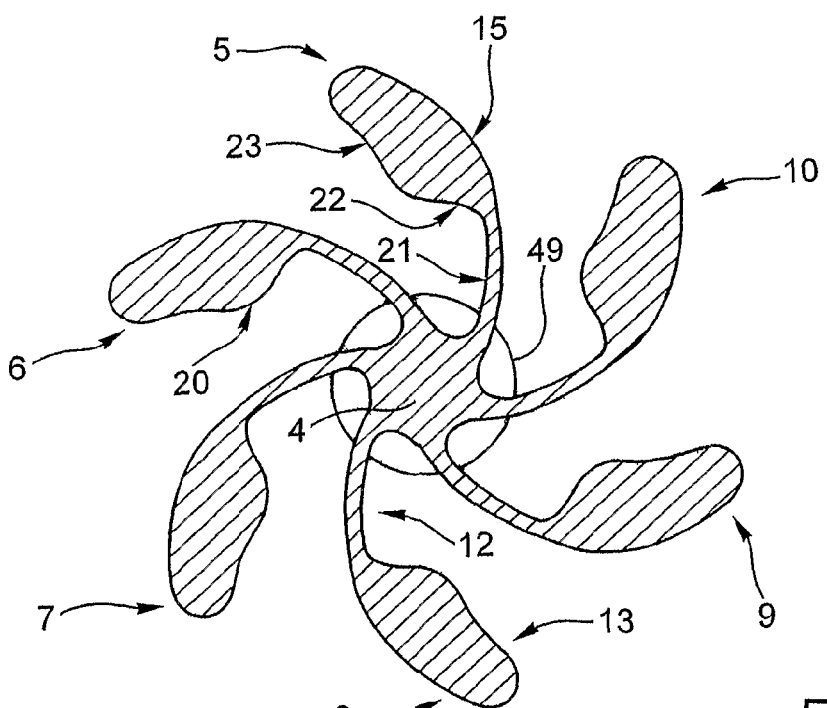
Figure 7:
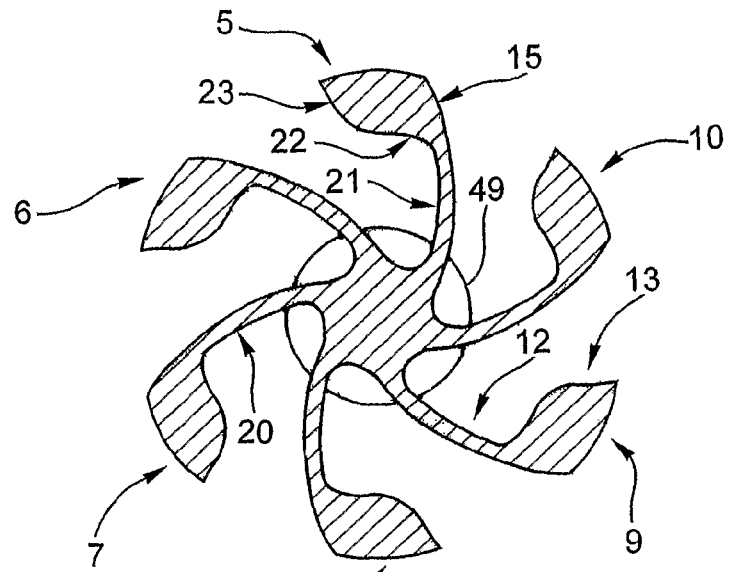
Figure 8:
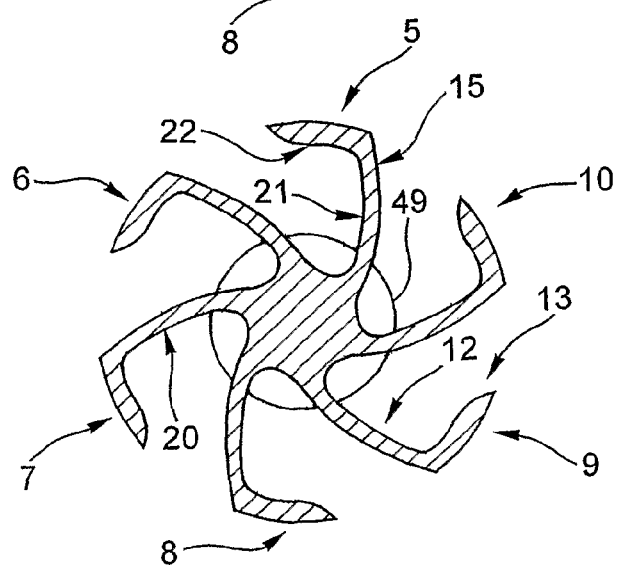
Figure 9:
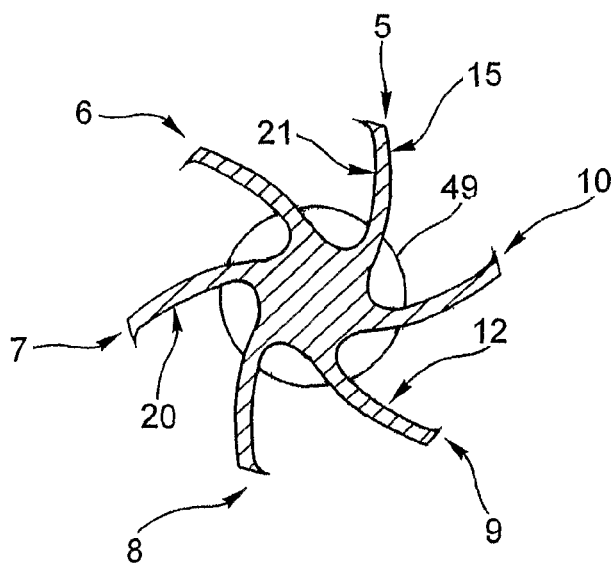
Figure 10:
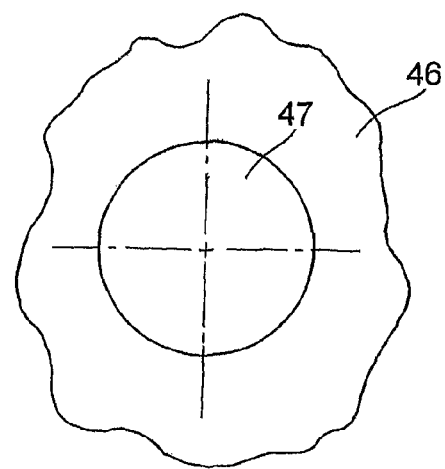
FIG. 10 is a plan view of the panel on which the illustrated fastener is to be fixed, showing the neighborhood of the hole where the snap-engagement foot is to be introduced.
Figure 11:
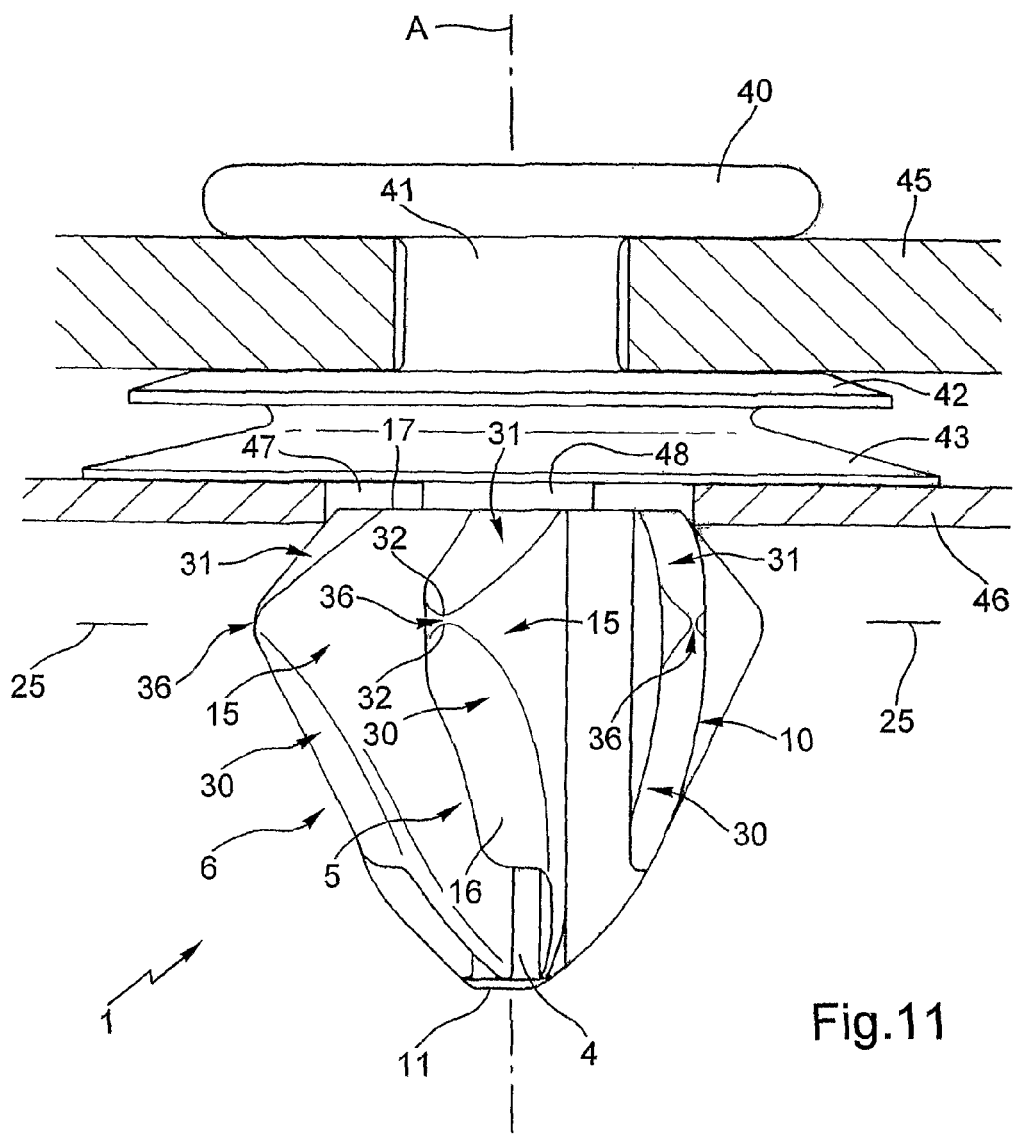
Figure 12:
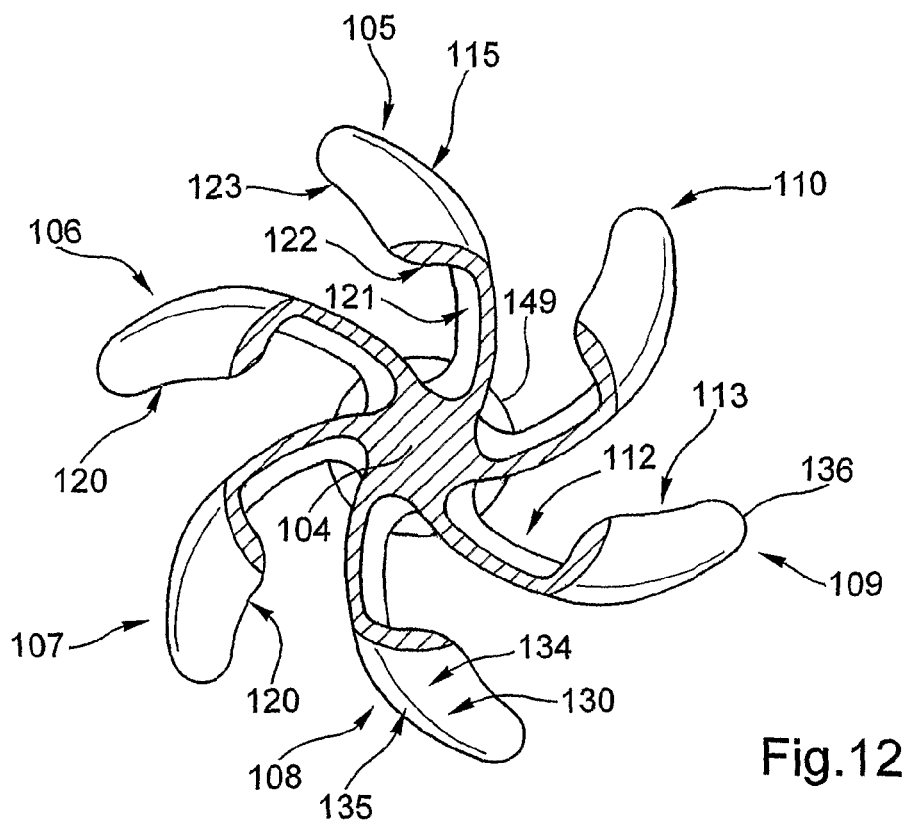
Figure 13:
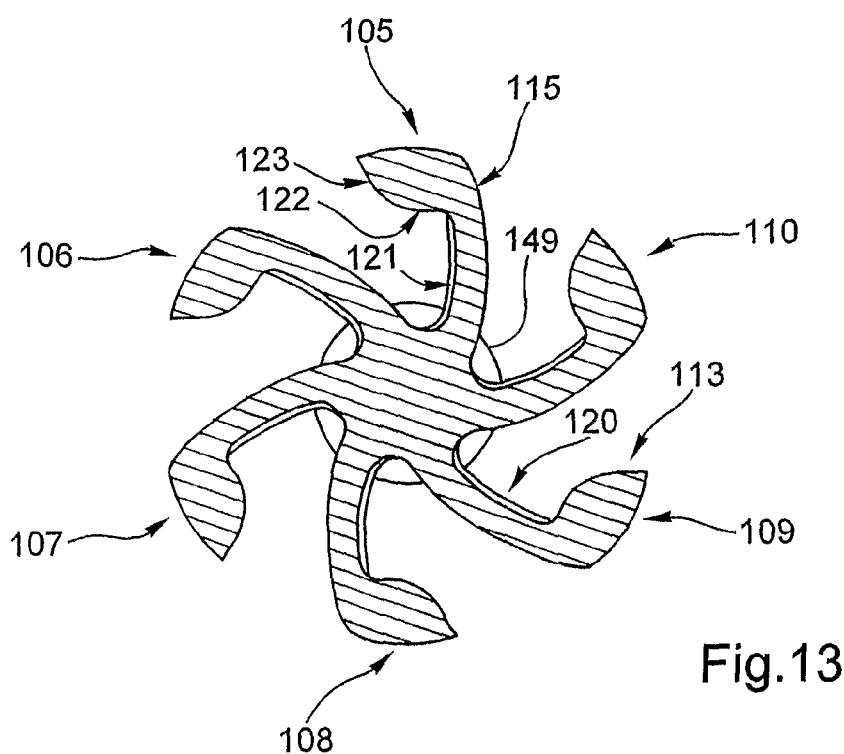

FIG. 11 is a view in elevation of that fastener in place in a member to be fixed and snap engaged onto a panel, the member and the panel being represented in cross-section; and FIGS. 12 and 13 are cross-section views of the foot of a fastener according to a variant embodiment, similar to those of FIGS. 4 and 7 and taken on two respective planes situated at the same level as planes IV-IV and VII-VII identified in FIG. 1.

The fastener 1 is of plastics material molded as a single piece. It comprises a head 2 and a snap-engagement foot 3.

The snap-engagement foot 3 comprises a hub 4 and six identical wings 5 to 10.

The hub 4 extends transversely to the head 2. The hub 4 is cylindrical and has an axis A which is more generally the main axis of the fastener 1. The hub 4 is connected at one of its ends to the head 2 whereas its other end 11 is free.

The wings 5 to 10 are connected to the hub 4 and are regularly distributed around the hub, with an angular spacing of 60° between two successive wings.

The wing 5 will now be described. The following description of the wing 5 also applies to the wings 6 to 10, the six wings 5 to 10 being identical.

The wing 5 comprises a web 12 and a corner 13. The web 12 is connected to the hub 4 and the corner 13 is connected to the web 12.

The web 12 is a thin cylindrical wall portion; the corner 13 is a solid, thicker portion. The corner 13 is rigid overall whereas the web 12 is more pliable and is adapted to flex.

The wing 5 has a resting position when subject to no external biasing.

Because the snap-engagement foot 3 is adapted to be thrust into a hole, when the wing 5 enters into contact with the outline of a hole and the outline of the hole bears on wing 5, the web 12 flexes and the corner 13 moves towards the web 12 of the neighboring wing 6.

The wing 5 is bordered by the hub 4, by an outwardly oriented longitudinal edge surface 16 and by a transverse edge surface 17 facing the head 2.

The wing 5 has two main surfaces, a convex surface 15 of which the cross-section transverse to the axial direction of the foot 3 has the general form of an arc of a circle and a surface 20 on the opposite side from the convex surface 15. The surface 20 comprises a surface portion 21 which belongs to the web 12. This surface portion 21 is concave and has a profile corresponding to that of the surface 15. Surface 20 also comprises a rectilinear shoulder 22, connected to the surface 21 and generally oriented transversely to that surface 21. The surface 20 also comprises a surface portion 23 connected to the shoulder 22 and bordered by the longitudinal edge surface 16.

In the axial direction of the foot 3, the wing 5 comprises an introductory portion situated between the free end 11 and an inflection plane 25 transverse to the hub 4, and a retaining part situated between the inflection plane 25 and the transverse edge surface 17.

The longitudinal edge surface 16 comprises a first branch 30 extending between the free end 11 and the inflection plane 25 and a second branch 31 extending between the inflection plane 25 and the transverse edge surface 17. The branch 31 is shorter than the branch 30.

On the corner 13, these two branches 30, 31 are wider. They have a convergent outline and a pointed end 32. The ends 32 of the branches 30, 31 are each located in the inflection plane 25.

On each side of the inflection plane 25 the outer surface of the foot 3 tapers respectively towards the pointed end 11 and towards the transverse edge surfaces 17 of the wings 5 to 10.

Thus, for an observer who looks at the surface 15, the longitudinal edge surface 16 has a V-shape of which the point is outwardly oriented and is situated in the inflection plane 25 such that the wing 5 has a vertex 36 situated in that inflection plane 25.

The ends of the surfaces 15, 20 away from the hub 4 are pointed, and are situated in the plane 25. Moreover, the surfaces 15, 20 and the branches 30, 31 meet at the vertex 36 of the wing 5.

Figure 2:
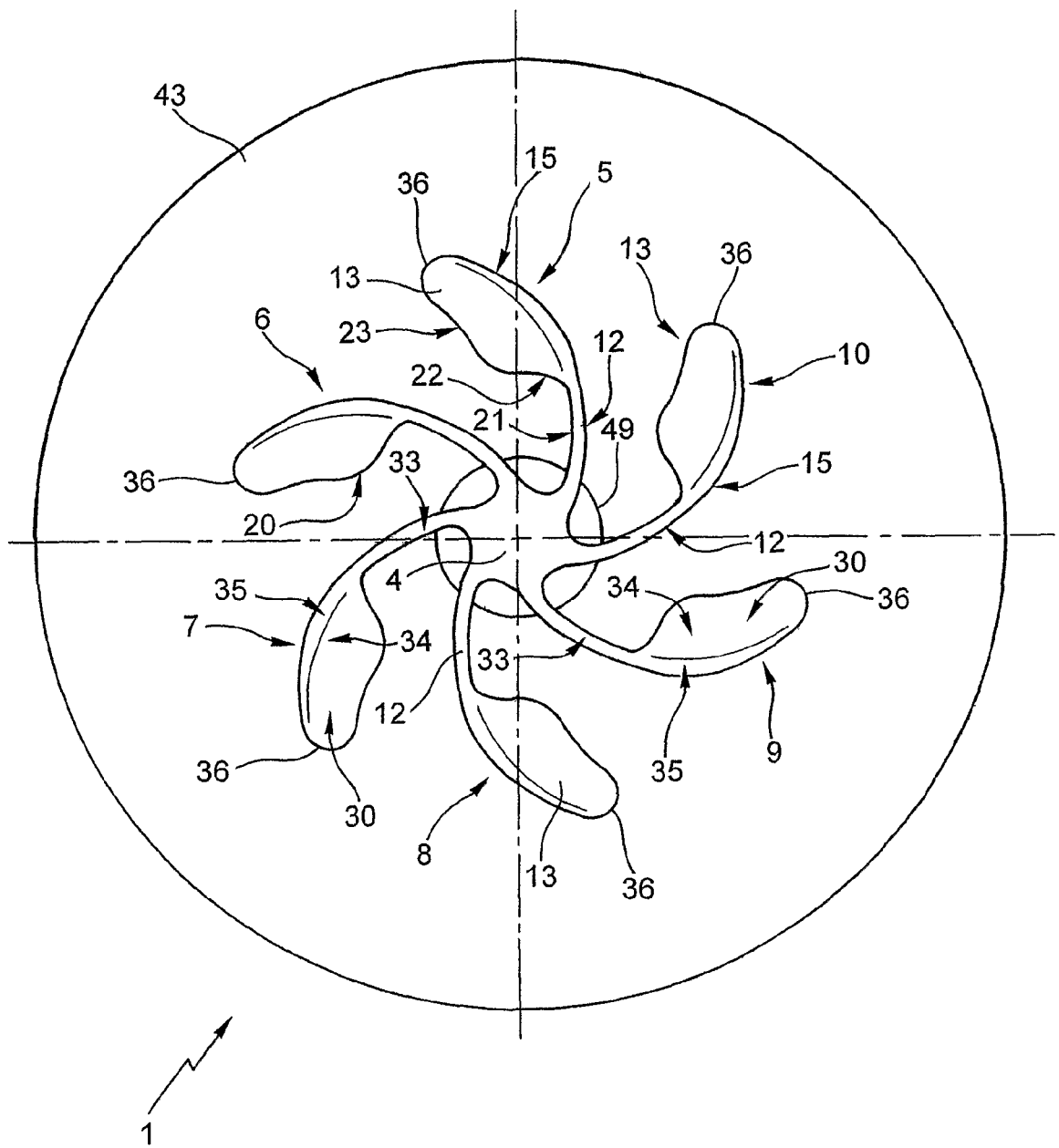
FIG. 2 is a plan view of that fastener from below.
Figure 3:
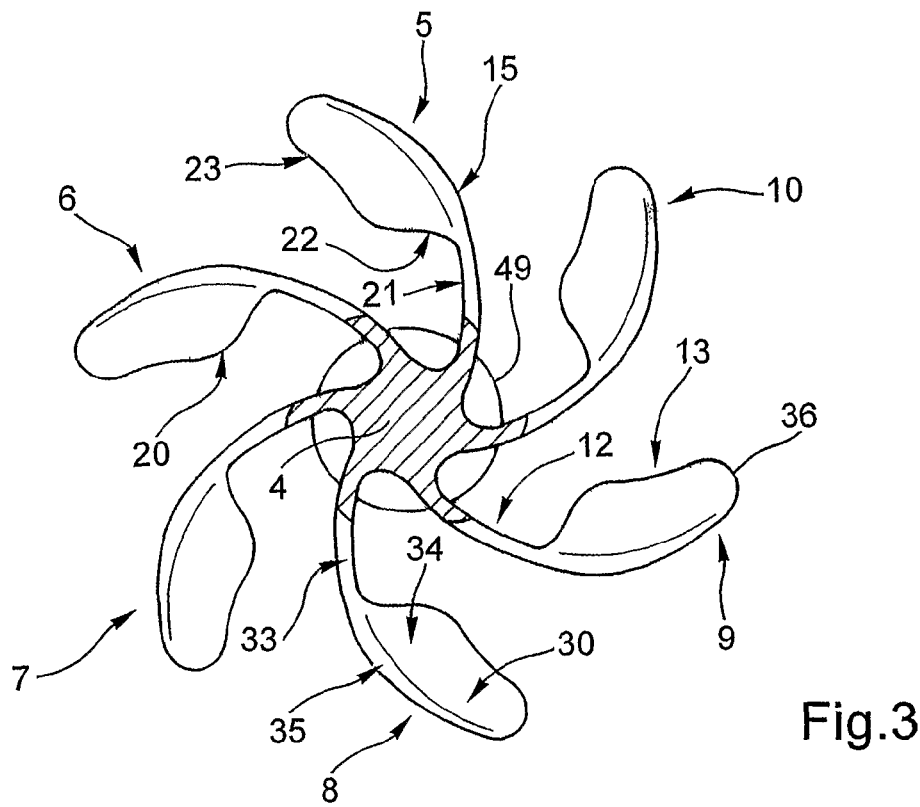
FIGS. 3 to 9 are cross-section views of the foot of that fastener taken on the respective planes III-III to IX-IX identified in FIG. 1, the fluid-tight collar not being represented.

As can be seen in FIG. 2, the branch 30 has a portion 33 belong to the web 12 and a portion 34 belonging to the corner 13.

The portion 33, which is rounded and which belongs to the web 12, is thin with respect to the width of the portion 34.

The portion 34 belonging to the corner 13 comprises a thin zone 35 of junction with the surface 15. The zone 35 is rounded and extends on a locus continuous with the portion 33 and between that portion 33 and the vertex 36.

The transverse edge surface 17 which belongs to the web 12 is situated adjacent the end where the head 2 is located.

As can be seen in FIGS. 3 to 9, the cross-section of the foot 3 has a generally circular outline of which the diameter increases on going towards the plane 25.

Starting with its opposite end from the foot 3, the head 2 comprises a flange 40, a shank 41, a plate 42 and a fluid-tight collar 43, these different members being coaxial and each having a generally circular form.

The annular space located around the shank 41 and between the flange 40 and the plate 42, is provided to receive a trimming piece 45 (FIG. 11) such as a car body side embellishment having an opening in the form of a keyhole of which the round part is of a diameter corresponding to that of the flange 40 and of which the elongate portion is of width corresponding to that of the shank 41.

The wall thickness of the member 45 in which the keyhole opening is made corresponds to the separation between the flange 40 and the plate 42, the mounting of the member 45 being achieved by pushing the flange 40 through the round part of the keyhole opening then by sliding the member 45 parallel to the orientation of the elongate portion of the keyhole opening, such that the shank 41 engages in that elongate portion.

The fluid-tight collar 43 conventionally has a frusto-conical shape, but is of particularly small thickness. The plate 42 consequently comprises an extension outwardly beyond its connection with the collar 43, making it possible to avoid continuation of the pushing of the head 2 into the round part of the keyhole opening beyond the plate 42 (if the wall of the member 45 were to abut directly against the collar 43, the flexibility thereof would mean that the collar 43 could pass through the round part of the keyhole opening).

The collar 43 is connected to the hub 4 by a shank 48. At its end adjacent the foot 3, the shank 48 is cylindrical whereas at the junction with the collar 43, the shank 48 is flares slightly outwardly as far as a common intersection line 49 with the surface of the collar 43 facing the foot 3.

The panel 46 to which it is intended to fix the fastener 1 (FIG. 11) has a hole 47 of circular outline of specific diameter.

The foot 3 is provided to be thrust into the hole 47, the end 11 first, the contact of the foot 3 with the outline of the hole 47 occurring via the portions 34 of the longitudinal edge surfaces 16.

When the foot 3 is thrust into the hole 47, the portions 33 then 34 of the branches 30 come into contact with the outline of the hole 47. Under the effect of the pressure applied and by virtue of the rigidity of the corners 13 and of the shape of the introductory part of the wings 5 to 10, the webs 12 act as a hinge enabling the progressive flexing of each wing 5 to 10 towards the convex surface 15 of the neighboring wing. This flexing makes the circumference of the hole 47 coincide with that of the foot 3 at the level of that hole 47 such that the foot 3 can be further pushed in until the level of the inflection plane 25 is reached.

If application of the pressure is ceased before that point, the wings 5 to 10 will undergo elastic relaxation that is to say that they will start to extend to resume their resting position, the effect of which will be to move the foot 3 in the direction opposite to the pushing in.

If the level of the foot 3 corresponding to the inflection plane 25 is passed, by continuing the pushing in, it is the branches 31 that come into contact with the outline of the hole 47. In the retained part, the outer surface of the foot 3 tapers towards the transverse edge surfaces 17 such that the more the foot 3 is pushed in, the more the wings 5 to 10 can extend towards their resting position.

At this stage, the effects of the pushing in pressure and of the elastic relaxation of the wings act together such that, even if application of the pushing in pressure is ceased, the wings 5 to 10 will extend to resume their resting position the effect of which will be to move the foot 3 in the direction of pushing in.

Pushing in is continued until abutment occurs on the face of the panel 46 situated on the side from which the pushing in of the foot 3 has been carried out where the fluid-tight collar 43 is applied against the panel 46.

Due to the thinness of the collar 43, it is provided that the stop (not shown) which stops the pushing in movement of the foot 3, is present on the member 45 to be fixed rather than on the fastener 1.

If the fastener 1 is pulled upon, the branches 31 are in contact with the outline of the hole 47 and the wings 5 to 10 all flex in the same direction around the hub 4. The foot 3 is pulled out of the hole 47 until the level of the inflection plane 25 is reached.

If pulling is ceased before that point, the wings 5 to 10 will resume their resting position the effect of which will be to move the foot 3 in the direction of pushing in (opposite to the direction of pulling).

If the level of the foot 3 corresponding to the inflection plane 25 is passed, the wings 5 to 10 can progressively resume their resting position due to the outer surface of the foot 3 tapering towards the free end 11.

At this stage, the effects of pulling on the foot 3 and the elastic relaxation of the wings 5 to 10 combine such that, even if the pulling is ceased, the wings 5 to 10 will resume their resting position the effect of which will be to move the foot 3 in the direction of pulling.

The difference in slope of the branches 30 and 31 contributes to enabling the foot to be pushed in with a relatively moderate force whereas the retaining force in the hole 47 is relatively high.

When the fastener 1 is in place and enables the member 45 to be fixed to the panel 46, the outline of the hole 47 is in contact with the branches 31.

On use, the member 45 and the panel 46 may be caused to move with respect to each other. These movements may create forces in the direction of extraction of the fastener 1 while having a transverse component acting on the foot 3. When the extraction is not carried out along the axis of the foot 3, forces having such a component also exist.

Due to the regular distribution of the wings 5 to 10 all around the hub 4 and due to the thickness of the edge surfaces 16 at the level of the contact with the outline of the hole 47, the force may be taken up by deformation of several of the wings 5 to 10.

This makes it possible to avoid the fastener being damaged or even destroyed even if it is subjected to that type of force, at high magnitude. Even though the retaining force is relatively high and even though the fastener is rarely withdrawn along its axis, it is possible to withdraw the fastener without damaging it.

A variant of the embodiment illustrated in FIGS. 12 and 13 will now be described.

For this variant, the same references as earlier have been kept for similar parts, increased by the number 100.

The web 112 is of greater thickness adjacent the transverse edge surface (which corresponds to the transverse edge surface 17 of the embodiment represented in FIGS. 1 to 9 and 11) than adjacent the free end (which corresponds to the free end 11 of the embodiment represented in FIGS. 1 to 9 and 11), and more particularly the thickness increases regularly towards the transverse edge surface. The greater thickness of the web 112 adjacent the transverse edge surface makes the flexing of the web 112 more difficult there than adjacent the free end. This difference in thickness, in addition to the effect of the difference in slope of the branches, contributes to enabling the foot to be pushed in with a relatively moderate force whereas the retaining force is relatively high.

According to another variant not shown, the web has a first thickness adjacent the transverse edge surface, and a second thickness adjacent the free end. The two thicknesses are different and the web has a transverse shoulder at a specific distance from the transverse edge surface.

In other variants not shown, the fastener comprises a number of wings different from six, and at least equal to three, for example five or seven wings regularly distributed around the hub.

In other variants, rather than being molded as a single piece, the head is overmolded onto the foot.

Numerous other variants are possible according to circumstances, in particular in the constitution of the head 2, which may for example be replaced by a head serving to fix cables or tubes rather than a trimming piece having a keyhole opening.

The present invention is not limited to the embodiment described and represented but covers any variant form.

The invention claimed is:
1. A fastener, comprising:
a head; and
a snap-engagement foot, wherein said foot comprises:
a rigid core, which extends from said head and terminates at a free end, and curved flexible wings, each said wing having a convex surface bordered by said core, by a longitudinal edge surface and by a transverse edge surface facing said head, wherein said foot is tapered respectively towards the free end of said core and towards said transverse edge surfaces of said wings on each side of an inflection plane that is transversely oriented to said core, each said longitudinal edge surface has a V-shape of which the point is directed outwardly and is located at said inflection plane, said core is a substantially cylindrical hub about which at least three said wings are regularly spaced, each said wing comprising:

a web extending radially from the hub, an enlarged end portion extending radially further from the web, said enlarged end portion being thicker than the web, and a shoulder between the web and the enlarged end portion;

wherein said enlarged end portion is delimited by said longitudinal edge surface of said wing on each side of said inflection plane and by said shoulder, and said shoulder and a surface of the enlarged end portion situated between said longitudinal edge surface and said shoulder are on the opposite side from said convex surface, and each said wing is adapted, in order to allow a snap engagement of said foot in a hole in a panel, to flex by elastic deformation towards the convex surface of the neighboring wing situated on the same side as said shoulder.

2. A fastener according to claim 1, wherein said longitudinal edge surface comprises on each side of said inflection plane a branch having, on said enlarged end portion, a convergent outline and a pointed end defining the point of the respective V-shape at said inflection plane.

3. A fastener according to claim 2, wherein said branch, that is situated between said free end and said inflection plane, comprises a first branch portion belonging to said web and a second branch portion belonging to said enlarged end portion which has a junction zone with said convex surface, said junction zone being situated on a locus continuous with said first branch portion.

4. A fastener according to claim 1, wherein for each said wing, said transverse edge surface extends between said hub and said shoulder, facing said head.

5. A fastener according to claim 1, wherein said longitudinal edge surface of each said wing comprises a first branch situated between said free end and said inflection plane, and a second branch situated between said inflection plane and said transverse edge surface of that wing, wherein the first branch is longer than the second branch.

6. A fastener according to claim 1, wherein said shoulder is rectilinear.

7. A fastener according to claim 1, wherein said web is of constant thickness.

8. A fastener according to claim 1, wherein said web has a greater thickness towards said transverse edge surface than towards said free end.

9. A fastener according to claim 1, wherein said wings are identical.

10. A fastener according to claim 1, wherein the fastener further comprises six said wings.

11. A fastener, comprising:

a head; and a snap-engagement foot, wherein said foot comprises:

a core which extends from said head and terminates at a free end, and at least three curved flexible wings regularly spaced around said core, each said wing having opposite first and second sides and, on the first side, a convex surface that is convex towards a neighboring wing among said wings;

wherein said foot is tapered respectively towards the free end of said core and towards said head on each side of an inflection plane that is transversely oriented to said core, each said wing has a longitudinal edge surface having a V-shape of which the point is directed outwardly and is located at said inflection plane, a web extending radially from the hub, an enlarged end portion extending radially further from the web, said enlarged end portion being thicker than the web, and a shoulder between the web and the enlarged end portion;

wherein said enlarged end portion is delimited by said longitudinal edge surface of said wing on each side of said inflection plane and by said shoulder, and said shoulder and a surface of the enlarged end portion situated between said longitudinal edge surface and said shoulder are on the second side opposite from said convex surface, and each said wing is adapted, in order to allow a snap engagement of said foot in a hole in a panel, to flex by elastic deformation towards the convex surface of the neighboring wing facing said shoulder.

* * * * *